United States Patent Office 3,506,176
Patented Apr. 14, 1970

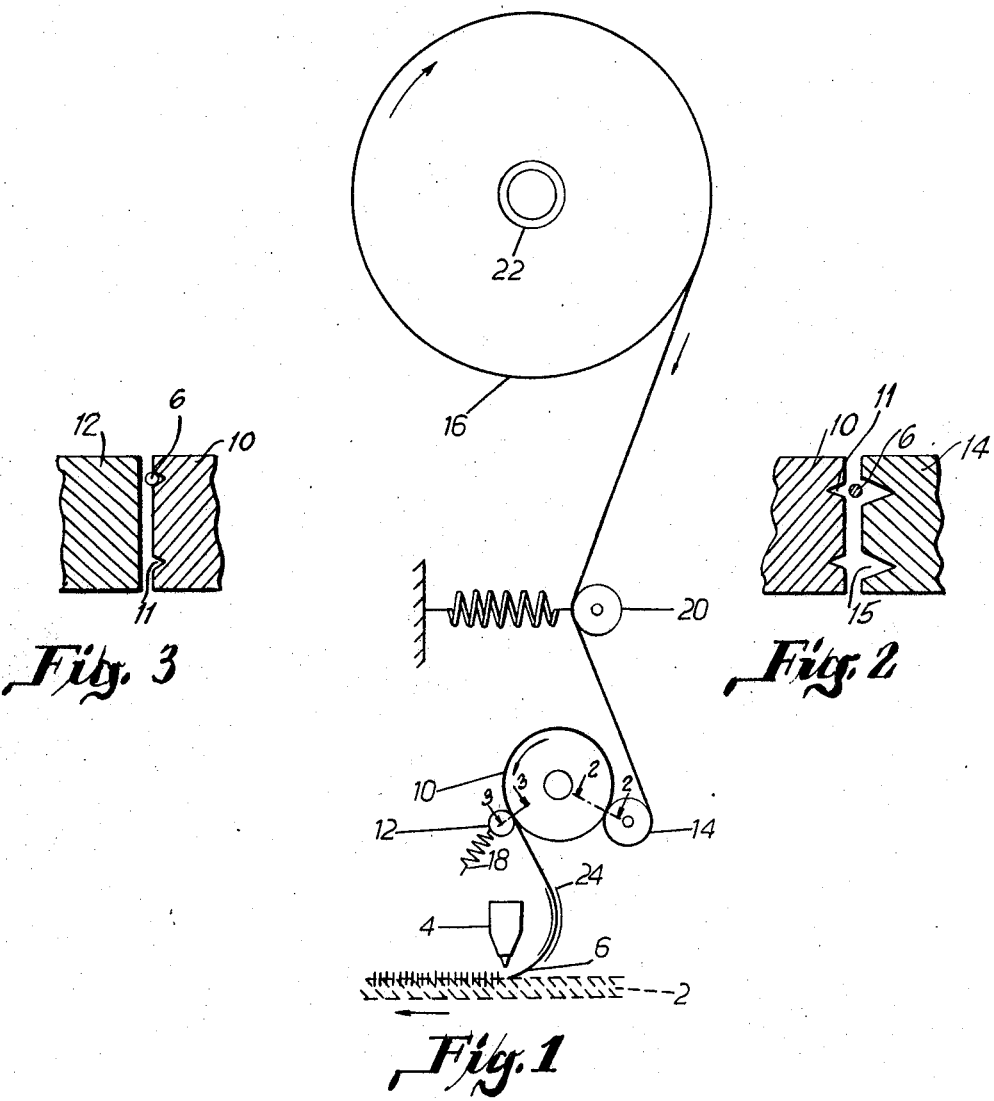

3,506,176
FEEDING OF WIRE IN ELECTRODE WELDING PROCESSES
Kenneth William Brown, Abington, Cambridge, England, assignor to British Welding Research Association, Cambridge, England, a British company
Filed Feb. 6, 1968, Ser. No. 703,281
Claims priority, application Great Britain, Feb. 9, 1967, 6,314/67
Int. Cl. B65h 17/20
U.S. Cl. 226—183  6 Claims

ABSTRACT OF THE DISCLOSURE

A tractive roller, having a wedge-shaped groove, and another roller are biased into engagement with one another and cooperate with a fixed roller such that welding wire extends around an arc of the tractive roller within the groove and is fed by the rollers.

---

There are many welding processes which require a controlled rate of wire feed. In consumable electrode welding where the electric current flow is closly associated with the feed rate of the welding wire, consistent good quality welds can only be obtained if a firm positive feed of the consumable electrode wire is maintained. similarly, in non-consumable electrode welding processes the feeding of a filler wire to the weld pool needs to be closely controlled. One example of the latter type of process is in microplasma welding where the amount of filler material fed to the weld pool is very small compared with the more usual welding applications and hence very fine wires are employed. These very fine wires are easily damaged and where, for example, the wire is fed between a pair of feed rolls having grooved or serrated drive faces, a slight under or over tightening of the rolls, causing wire slippage or damage to the wire respectively, can be sufficient to impair the quality of the weld.

Filler wire is often available only from reels where the wire has not been regularly wound in layers, and the varying pull-off force required to unwind the reel, due to the binding or wedging of adjacent coils is a potential source of trouble where regular wire feed is essential. Thus the tension in the wire during unwinding of the reel can reach a very high peak value along a nipped section of the wire, and then fall to zero as the nipping is relieved. This results in a wide range of demanded tractive effort on a wire feed device, and is likely to produce corresponding variations in the speed at which wire is fed out from the device.

According to the persent invention the tractive effort applied to the wire is maintained substantially constant by forming a wedge shaped groove around the periphery of one of a pair of rotatable bodies of circular cross section resiliently biased into contact with one another, and feeding the welding or filler wire into the groove at one end of an arc of the periphery, the wire being pulled down into the groove by a tensioning force applied to the wire over the length of the arc when rotating the bodies in opposite senses, such that the wire is forwarded round the arc and is fed out between the contacting surfaces of the pair of rotatable bodies at the other end of the arc. The length of the arc is such that any increase in the applied tension is immediately compensated by a corresponding increase or decrease of tractive effort due to the wire falling or rising respectively in the groove, and hence the wire is consistently fed out at the preset speed of the grooved body. In the preferred form of apparatus for carrying out the invention the groove is formed around the periphery of a large tractive wheel, the wire is guided on to the wheel from a fixed pulley system and the wire is fed out between the surfaces of the tractive wheel and a freely rotatable pressure roll. The wire will then normally pass into an outlet guide tube leading to the weld pool.

One example of the invention is shown in the accompanying drawing in which:

FIGURE 1 is a schematic diagram of a fine wire feeder unit of the invention for use in microplasma welding processes.

FIGURE 2 is a fragmentary sectional view taken on the line 2—2 of FIGURE 1.

FIGURE 3 is a fragmentary sectional view taken on the line 3—3 of FIGURE 1.

With reference to the drawing, a workpiece 2 traverses in the direction shown beneath a microplasma welding torch 4, and a filler wire 6 is fed into the melt pool from the feeder unit at a controlled rate.

A tractive wheel 10 driven by a motor (not shown) has two V-shaped grooves 11 machined around the periphery to hold either 0.010 inch or 0.015 inch diameter filler wire. The wires sit in a 45° including angle of such depth that approximately one third of the wire diameter protrudes above the rim surface, thereby permitting compressive loading of the wire into the groove by a freely rotatable pressure roll 12. In fact, the choice of the V angle is dependent upon the hardness of the wire being fed and/or the tractive effort required. For very soft wires, a group of pressure rolls may replace the single roll 12 to maintain sufficient tractive effort without damaging the wires. A fixed collector pulley 14 also has two V grooves 15 corresponding to those on the tractive wheel and aligned with them, but in this case the included angle is 90° and the grooves are each approximately 1/16 inch deep. This provides a wide angle of acceptance for the wire from a delivery spool 16, but ensures sufficiently accurate delivery to the tractive wheel groove. The pressure roll 12 is of relatively small diameter with a plane periphery, and presses the wire into the groove in the tractive wheel. There is an adjustable compression spring 18 for wires of different hardness. The collector pulley is fixed and does not therefore exert any pressure on the wire as it is loaded into the groove, the wire being held in the groove by the tension which is adjusted by means of a spring loaded tension pulley 20. The delivery spool has a friction braked hub 22 and any excessive over-run not contained by the hub friction is taken by the spring loaded tension pulley which may be attached to a dancer arm (not shown). The hub friction can be preset to maintain a minimum tension of 1 lb. in the wire during over-run conditions.

The tractive wheel may be secured to a gear wheel and the assembly is then free to rotate on a central spigot bearing, with a meshing gear pinion on an electric motor reduction gear box output shaft to transmit the driving torque to the tractive wheel. Alternatively, the torque may be supplied to the pinion by shafting driven through a variable ratio gear box from an electronic speed controlled electric motor.

The low column strength of the fine wire under buckling loads also makes it preferable to collect the wire from the tractive wheel with a minimum of unsupported length before entering the guide tube inlet nozzle 24.

In operation the tractive wheel is rotated and the tensioned wire is pulled down into the V-shaped groove until sufficient tractive effort is gained to override the braking force on the hub of the delivery spool and the wire begins to unwind. The tension in the wire fluctuates due to the different pull-off forces required, but the effect of these compensations on the rate at which the wire is fed out from the tractive wheel is compensated by the wire rising or falling in the groove and thereby varying the applied tractive force. Specifically, if the reel overruns itself the tension in the wire will fall and the wire tends to rise up in the groove. The tractive effort exerted by the wheel automatically decreases and compensates for the fall in tension. Again, if the wire is pulled further down into the groove due to an increase in the tension, there is a corresponding increase in tractive effort.

I claim:

1. A wire feed device for feeding welding or filler wire in consumable or non-consumable welding processes respectively, comprising:
   (a) a first rotatable body of circular cross section,
   (b) a wedge shaped groove formed around the periphery of said body,
   (c) first guide means for aligning the said wire with the said groove at one end of an arc of the said pheriphery,
   (d) a second rotatable body positioned at the other end of said arc and resiliently biased toward said first body to press said wire into said groove,
   (e) driving means for rotating the said two bodies in opposite senses, and
   (f) means for tensioning the said wire over the length of the said arc when the two said bodies are rotated in the opposite senses, the length of the arc being sufficient for any variations in tension to be substantially compensated by corresponding variations in the tractive effort applied to the wire due to the wire rising or falling in the groove and
   (g) second guide means for leading the said wire out of the said groove from between the diverging surfaces of the said bodies whereby the wire is fed out at a substantially constant speed.

2. A device according to claim 1, in which the groove is formed around the periphery of a tractive wheel and the other of the said bodies comprises a freely rotatable pressure roll, or a group of rolls.

3. A device according to claim 2, in which the first guide means comprises a fixed collector pulley positioned adjacent the tractive wheel for receiving the wire from a delivery spool, the pulley including a groove formed around its periphery aligned with the groove in the tractive wheel.

4. A device according to claim 3, in which the pulley groove is wedge shaped but with a wider angle of acceptance than the groove in the tractive wheel.

5. A device according to claim 3, in which the means for tensioning the wire comprises a friction braked hub mounted on the delivery spool.

6. A device according to claim 5 further comprising a spring loaded tension pulley positioned between the delivery spool and the collector pulley for containing any excess over-run of the delivery spool.

References Cited

UNITED STATES PATENTS 3,078,074   2/1963   Benedict _____ 226—183 X

ALLEN N. KNOWLES, Primary Examiner

U.S. Cl. X.R.

226—184, 187